US012497923B1

(12) United States Patent
Miller et al.

(10) Patent No.: US 12,497,923 B1
(45) Date of Patent: Dec. 16, 2025

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/197,884

(22) Filed: May 2, 2025

Related U.S. Application Data

(63) Continuation-in-part of application No. 18/744,069, filed on Jun. 14, 2024, now Pat. No. 12,292,017.

(51) Int. Cl.
| | |
|---|---|
| *F02K 3/06* | (2006.01) |
| *F02C 7/045* | (2006.01) |
| *F02C 7/24* | (2006.01) |
| *F02C 7/36* | (2006.01) |
| *F04D 29/66* | (2006.01) |

(52) U.S. Cl.
CPC ............ *F02C 7/36* (2013.01); *F02C 7/045* (2013.01); *F02C 7/24* (2013.01); *F02K 3/06* (2013.01); *F05D 2260/4031* (2013.01); *F05D 2260/96* (2013.01); *F05D 2260/961* (2013.01)

(58) Field of Classification Search
CPC .... F02K 3/06; F02C 7/045; F02C 7/24; F04D 29/666; F05D 2220/36; F05D 2240/12; F05D 2260/96; F05D 2300/603
See application file for complete search history.

(56) References Cited

U.S. PATENT DOCUMENTS

| | | | |
|---|---|---|---|
| 3,505,819 A | 4/1970 | Wilde | |
| 3,534,556 A | 10/1970 | Wilde | |
| 5,169,288 A | 12/1992 | Gliebe et al. | |
| 5,255,510 A * | 10/1993 | Lardellier | ............... F02K 3/075 |
| | | | 60/226.3 |

(Continued)

FOREIGN PATENT DOCUMENTS

EP 3 085 897 B1 9/2021

OTHER PUBLICATIONS

Gliebe et al., *Ultra-High Bypass Engine Aeroacoustic Study*. No. NASA/CR-2003-212525, 2003.

Primary Examiner — Brian Christopher Delrue
(74) Attorney, Agent, or Firm — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. The fan blades feature a low aspect ratio, reducing blade count while maintaining thrust and efficiency. Efficiency is enhanced through a determined relationship between fan blade count, aspect ratio, and specific flow.

20 Claims, 5 Drawing Sheets

(56) References Cited

U.S. PATENT DOCUMENTS

| | | | |
|---|---|---|---|
| 5,299,914 A * | 4/1994 | Schilling | F01D 5/141 416/223 A |
| 6,195,983 B1 | 3/2001 | Wadia et al. | |
| 7,118,331 B2 | 10/2006 | Shahpar | |
| 7,374,403 B2 | 5/2008 | Decker et al. | |
| 7,374,404 B2 | 5/2008 | Schilling et al. | |
| 9,540,938 B2 | 1/2017 | Topol et al. | |
| 10,107,191 B2 | 10/2018 | Gilson et al. | |
| 10,247,018 B2 | 4/2019 | Topol et al. | |
| 10,458,426 B2 | 10/2019 | Wilkin, II | |
| 10,584,632 B1 | 3/2020 | Kannangara et al. | |
| 10,677,264 B2 * | 6/2020 | Moniz | F04D 29/324 |
| 10,711,797 B2 | 7/2020 | Kroger et al. | |
| 10,815,886 B2 | 10/2020 | Kroger et al. | |
| 11,199,196 B2 | 12/2021 | Breen | |
| 11,377,958 B2 | 7/2022 | Lemarchand et al. | |
| 12,012,898 B2 * | 6/2024 | Miller | F02K 3/06 |
| 12,292,017 B1 * | 5/2025 | Miller | F02C 7/24 |
| 2006/0228206 A1 | 10/2006 | Decker et al. | |
| 2008/0283676 A1 | 11/2008 | Jain et al. | |
| 2009/0082976 A1 | 3/2009 | Anuzis et al. | |
| 2015/0044028 A1 | 2/2015 | Lord et al. | |
| 2016/0363137 A1 | 12/2016 | Topol et al. | |
| 2017/0022820 A1 | 1/2017 | Joseph et al. | |
| 2017/0122215 A1 * | 5/2017 | Houston | F02C 7/36 |
| 2017/0184053 A1 | 6/2017 | Harvey et al. | |
| 2017/0298954 A1 * | 10/2017 | Qiu | F04D 29/547 |
| 2017/0314562 A1 | 11/2017 | Rose | |
| 2018/0030926 A1 | 2/2018 | Eckett et al. | |
| 2018/0106274 A1 | 4/2018 | Moniz et al. | |
| 2019/0128123 A1 | 5/2019 | Paruchuri et al. | |
| 2019/0376529 A1 | 12/2019 | Joseph et al. | |
| 2020/0347785 A1 | 11/2020 | Morin et al. | |
| 2020/0400069 A1 | 12/2020 | Aguilera et al. | |
| 2022/0042461 A1 * | 2/2022 | Molesini | F02C 7/06 |
| 2022/0049621 A1 | 2/2022 | Sawyers-Abbott et al. | |
| 2022/0049656 A1 | 2/2022 | Sawyers-Abbott et al. | |
| 2023/0151777 A1 | 5/2023 | Bifulco et al. | |
| 2023/0280035 A1 * | 9/2023 | Depperschmidt | F23R 3/50 60/39.76 |
| 2024/0151185 A1 * | 5/2024 | Miller | F02K 3/06 |
| 2024/0318614 A1 * | 9/2024 | Mondal | F02C 3/06 |

\* cited by examiner

| Engine | As (193) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 30 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 20 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.275 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) |

FIG. 4

GAS TURBINE ENGINE WITH ACOUSTIC SPACING OF THE FAN BLADES AND OUTLET GUIDE VANES

CROSS-REFERENCE TO RELATED APPLICATIONS

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

DETAILED DESCRIPTION

Figure 1:
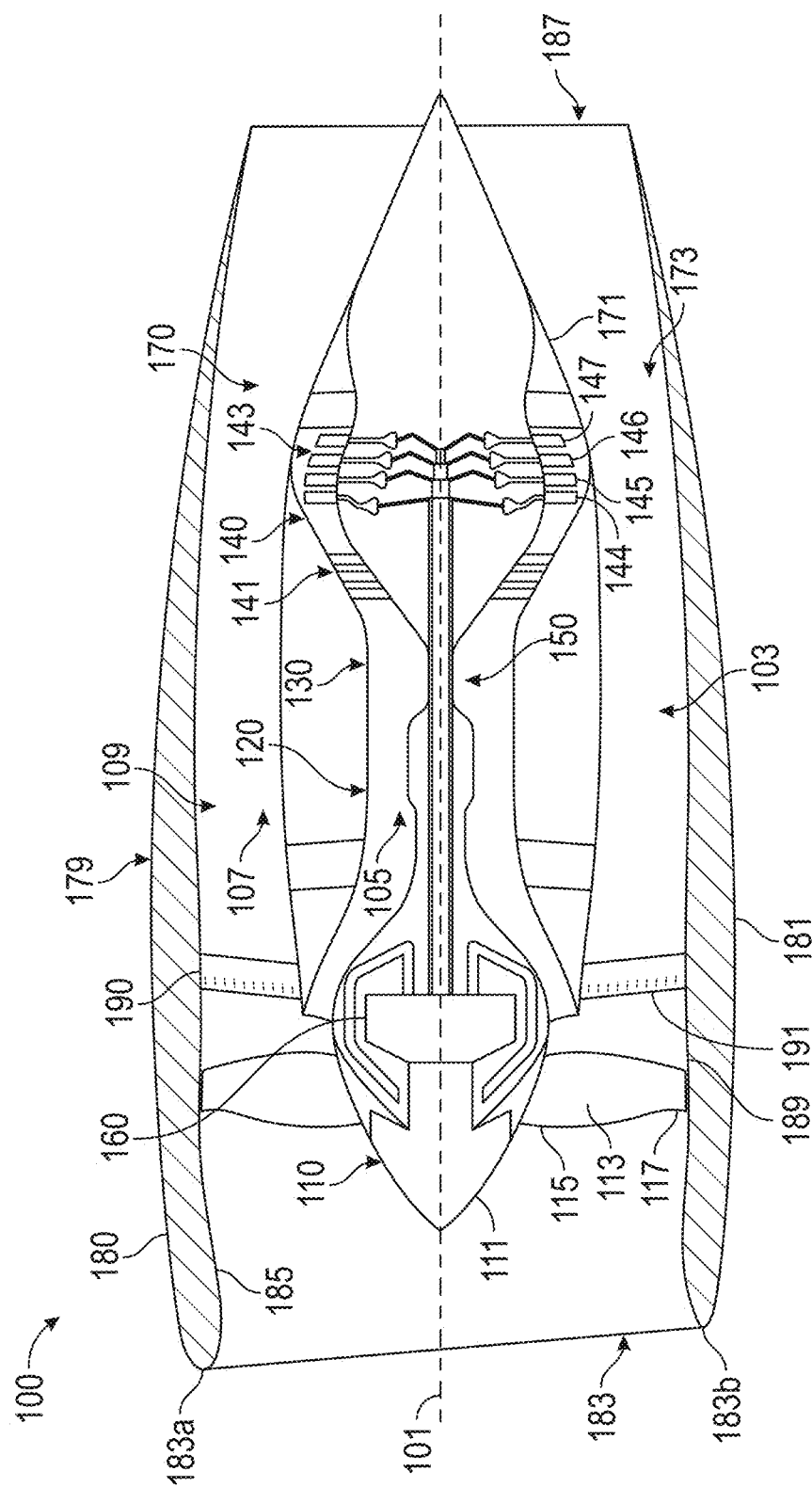
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

The terms "forward" and "aft" refer to relative positions within a gas turbine engine or vehicle, and refer to the normal operational attitude of the gas turbine engine or vehicle. For example, with regard to a gas turbine engine, forward refers to a position relatively closer to the nose of an aircraft and aft refers to a position relatively closer to a tail of the aircraft.

As used herein in this application and in the claims, the term "axial" refers to a dimension extending along a central longitudinal axis of the gas turbine engine from a forward portion of the gas turbine engine to an aft portion of the gas turbine engine.

As used herein in this application and in the claims, the term "radial" refers to a dimension extending radially outwards from the central longitudinal axis.

As used herein in this application and in the claims, the term "OGV" refers to an outlet guide vane of the gas turbine engine.

As used herein, term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

As used herein, the term "bypass ratio" refers to a ratio of the mass flow rate of the flow through the bypass duct to the mass flow rate of the flow through the core at cruise conditions.

As used herein, chord length is a straight-line distance between a leading edge and a trailing edge of a fan blade. The chord length can be taken at different span locations, such as at a 75% span position (where it is referred to as c1) and at a 50% span position (where it is referred to as c2).

As used herein, a "composite" component refers to a structure or a component including any suitable composite material. Composite components, such as a composite fan blade, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, a "polymer matrix composite" or "PMC" refers to a class of materials that can be used to form a composite fan blade as described herein. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (e.g., chord length, span, stagger angle, radius ratio, number of blades), can provide desirable improvements in noise reductions for the gas turbine engine.

Newer engine architectures may be characterized by higher bypass ratio (e.g., greater than 8.0, greater than 10.0, or greater than 12.0) engine designs to improve overall efficiency of the engine in converting kinetic energy to mechanical energy in the form of propulsion. For example, the bypass ratio is greater than 8.0 for engine thrust class of less than 20,000 lbf, greater than 10.0 for engine thrust class of about 20,000 lbf, and greater than 12.0 for engine thrust class of greater than 30,000 lbf. Typically, the fan size is increased to achieve the higher bypass ratios. However, it is desirable to reduce the diameter of the fan to minimize the drag of the engine and improve the installation characteristics on an aircraft including the proximity to the wing (reduced pylon size & weight) and reduced landing gear height.

The engine efficiency is also a function of the bypass ratio and the fan pressure ratio. Increasing the bypass ratio results in a longer fan blade but also increases the efficiency of the engine by enabling a lower fan pressure ratio. The thrust produced by the fan is a function of the specific flow of the fan and the pressure ratio across the fan. As the bypass ratio increases the percentage of thrust created by the fan increases, for a given total engine thrust.

The inventors evaluated the influence of various factors and unexpectedly identified important design considerations by systematically analyzing the interplay between material properties, aerodynamic performance, structural integrity, and engine efficiency. Their approach involved balancing competing objectives, such as reducing the number of fan blades, maintaining thrust, improving efficiency, and ensuring reliability, while addressing the challenges associated with these goals, including reduced acoustic noise by achieving the acoustic spacing parameters discussed herein.

The inventors analyzed the relationship between blade count and aspect ratio. They observed that reducing the number of blades necessitates an increase in blade chord, which decreases the aspect ratio. While fewer blades improve aerodynamic efficiency and reduce drag, each blade must produce more thrust, leading to increased stress. To accommodate this stress, blade thickness must be increased, which in turn increases blockage and reduces fan efficiency. This trade-off required careful consideration to balance reliability, efficiency, and aerodynamic performance.

The inventors also sought to reduce the fan diameter to minimize drag and improve installation characteristics, such as proximity to the wing, reduced pylon size and weight, and lower landing gear height. However, reducing the fan diameter introduced challenges related to maintaining thrust and efficiency.

The high reliability low blade count geared turbofan engine described herein utilizes the high strength to weight ratio of composite materials to significantly improves the reliability of the fan blade. The composite materials further support development of a wide chord fan blade that allows the number of fan blades to be minimized while maintaining the thrust of the engine.

Further improvements in engine efficiency are enabled by placing a gearbox between the fan and the fan drive turbine enabling the two components to both operate at a desired speed.

As described in more detail below, the inventors unexpectedly discovered that the interplay between acoustic spacing, blade count, aspect ratio, and specific flow creates a design space that improves engine performance. They identified that increasing the chord length and reducing the aspect ratio, while maintaining a minimum blade count, could achieve the desired thrust and efficiency without compromising reliability. Additionally, the integration of a gearbox and increasing bypass ratio further enhanced engine performance.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be 12 to 26 fan blades. In other examples, the plurality of fan blades 113 can number 14 to 24 fan blades, 20 to 24 fan blades, 20 to 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.45. In other examples, the FPR can be greater than 1.30 or 1.35, and less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extend along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective optimal rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be in a range of 2.5 to 6.0. For example, the gear ratio can be 2.7 to 5.0, 3.2 to 4.0, or 3.25 to 3.75.

The gearbox assembly 160 can be an epicyclic gearbox assembly in either a star gear or planet gear configuration. In the star gear configuration, the planet carrier is generally fixed (e.g., static) within the engine by support structure, and a sun gear driven by an input shaft (e.g., the low-pressure shaft). A ring gear is configured to rotate about the longitudinal engine axis centerline in a circumferential direction, which in turn drives the power output source (e.g., a fan shaft) that is coupled to and configured to rotate with the ring gear to drive the fan assembly. In this manner, the low-pressure shaft rotates in a circumferential direction that is the opposite of the direction in which the fan shaft rotates.

In other embodiments, the gear assembly can have a planetary configuration in which the ring gear is fixed (e.g., static) within the engine by a support structure. The sun gear is driven by an input shaft (i.e., low-pressure shaft) and instead of the ring gear rotating, the planet carrier rotates in the same direction as the low-pressure shaft rotation direction, to drive the power output source (e.g., a fan shaft) and fan assembly.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183*a* of the inlet 183, i.e., a portion of the inlet 183 at a twelve o'clock position when the gas turbine engine 100 is mounted to an aircraft, extends forward of a bottom portion 183*b* of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
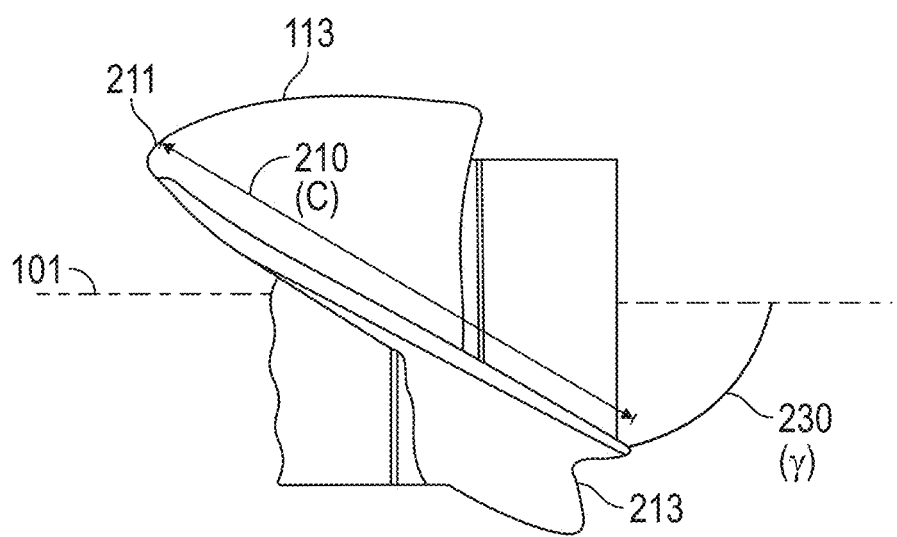
FIG. 2 shows a top view of a fan blade for a gas turbine engine, according to one example.
Figure 3:
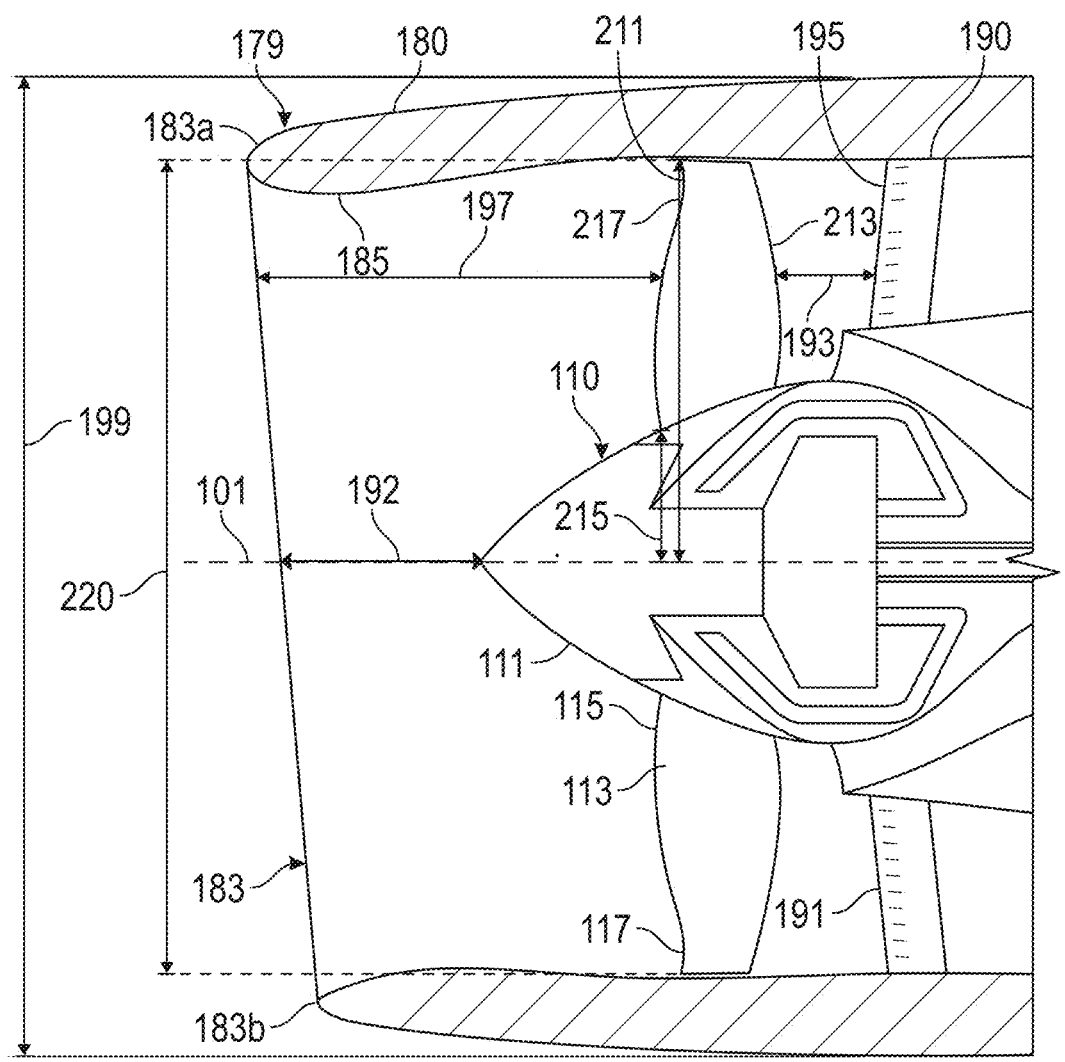
FIG. 3 is a partial view of a gas turbine engine, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing(s) between the fan blade 113 and a nearest adjacent fan blade 113, measured at a 75% span position of the fan blade 113. s shown in FIG. 2, the chord length 210 is a straight-line distance between a leading edge 211 and a trailing edge 213 of the fan blade.

The spacing(s) between adjacent fan blades is calculated by multiplying a fan diameter by x and dividing the product by the number ($N_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle (γ) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{s(1-rr)N_b}\cos(\gamma) \quad (1)$$

where c is the chord length at 75% span, rr is the radius ratio of the fan, S is the full span of the fan blade (i.e., as measured at a 100% span position at the blade leading edge), γ is the stagger angle, and $N_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

65≤FBD #1<80 inches
80≤FBD #2<95 inches
95≤FBD #3<115 inches

TABLE 1

| Symbol | Description | Exemplary Ranges for Use with BEAL |
|---|---|---|
| c | Chord length at 75% span position (ranges based on FBD) | 5" to 28" (for FBD#1) 6" to 33" (for FBD#2) 7" to 35" (for FBD#3) |
| S | Span of fan blade at 100% span position (ranges based on FBD) | 24" to 30" (for FBD#1) 28" to 36" (for FBD#2) 32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| γ | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 193 (As) is a length, measured parallel to the central longitudinal axis 101, that extends from the trailing edge 213 of the fan blade 113 to the leading edge 195 of a corresponding one of the OGVs 190. An inlet length 197 is an axial distance between the leading edge 211 of a fan blade 113 and the inlet 183. The acoustic spacing 193, chord length 210 (FIG. 2), and inlet length 197 are measured at the 75% span position of the fan blade 113. A fan diameter 220 is the diameter of the fan 110.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \quad (2)$$

Nv is the number of vanes of the OGVs. In some examples, the number of OGVs (Nv) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with the acoustic spacing ratios described herein exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 197 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 197 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 197 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 197 to a nacelle outer diameter 199, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates a disk spacing length 192, which is the distance between a forwardmost end of the fan disk 111 and the intersection of the inlet taken along the engine centerline (i.e., central longitudinal axis 101).

A disk-to-blade diametric (DBD) ratio is the ratio of the disk spacing length 192 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 192 to the nacelle diameter 199. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 192 to the inlet length 197. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 2

| Engine | fan-disk spacing length (in) 192 | fan diameter (in) 220 | nacelle diameter (in) 199 | inlet length (in) 197 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |

TABLE 2-continued

| Engine | fan-disk spacing length (in) 192 | fan diameter (in) 220 | nacelle diameter (in) 199 | inlet length (in) 197 | DBD Ratio | DND Ratio | DIL Ratio |
|---|---|---|---|---|---|---|---|
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines with fan blades having fan diameters in the FBD #3 range. In each of the exemplary engines, the ASR is in the range of 1.5 to 16.0.

As noted above, the ASR can be in the range of 1.5 to 16.0, or as shown in FIG. 4, in ranges from 1.5 to 4.1, 1.5 to 3.1, 1.6 to 3, 1.6 to 2.4 or 2.0 to 3, and, depending on the desired fan blade selection, higher ratios such as 4 to 14, 6.6 to 13.5, or 6.5-10.2.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

Figure 5:
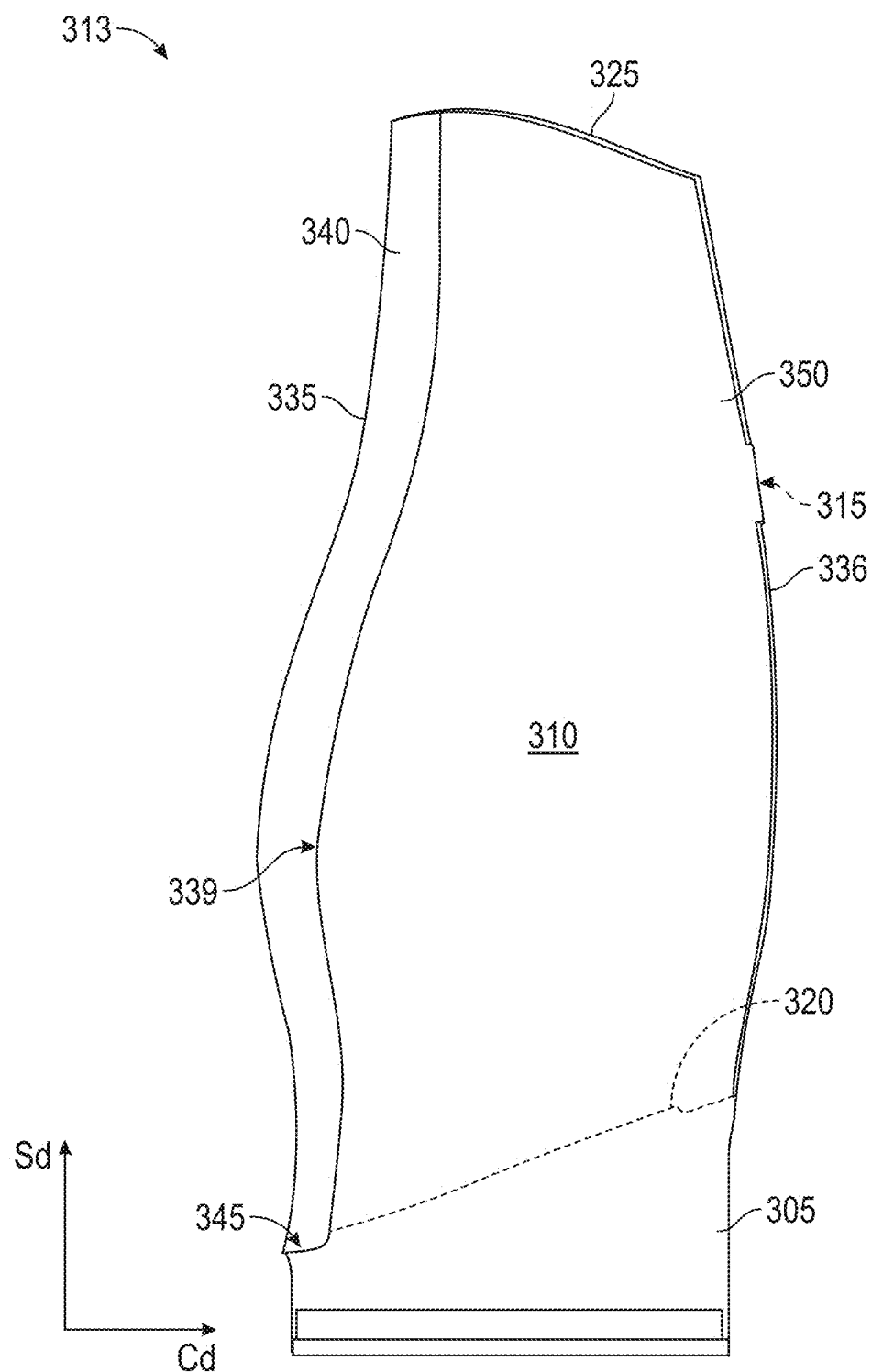
FIG. 5 shows exemplary composite fan blade for use with the exemplary gas turbine engines.

FIG. 5 illustrates an exemplary composite fan blade 313 according to an exemplary embodiment of the present disclosure. The composite fan blade 313 includes a pressure sidewall 310 and a suction sidewall 315 (shown with a dashed line) opposite the pressure sidewall 310. The pressure sidewall 310 and the suction sidewall 315 may define an exterior surface extending radially between a leading edge 335 and a trailing edge 336 in a chordwise direction (denoted "Cd"). The pressure sidewall 310 and the suction sidewall 315 may further extend between a base 320 and a tip 325 in a spanwise direction (denoted "Sd"). It will be understood that the composite blade may take any suitable shape, profile, or form including that the leading edge 335 need not be curved. The composite blade includes a leading edge protector 340 and a composite portion 350. A seam 839 separates the leading edge protector 340 from the composite portion 350 along the pressure sidewall 310 and the suction sidewall 315. The leading edge protector 340 extends along the leading edge 335 in the spanwise direction Sd and extends along the chordwise direction Cd between the leading edge 335 and the seam 339. In some embodiments, at least one projection 345 can extend past the base 320 of the composite fan blade 313 towards the root 305.

The composite portion 350 can be made of one or more layers of material. By way of non-limiting example, composite portion 350 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers. The composite materials of the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

In some embodiments, the leading edge protector 340 and the composite portion 350 can be formed by a variety of methods, including additive manufacturing, casting, electro-forming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

In some embodiments, the leading edge protector 340 can be a metallic leading edge protector and can be made of, but is not limited to, steel, aluminum, refractory metals such as titanium, or superalloys based on nickel, cobalt, or iron.

As noted above, the inventors of this disclosure found that increasing the chord length and reducing the aspect ratio, while maintaining a minimum blade count, and determined that the following relationship can achieve the desired thrust and efficiency without compromising reliability.

For a geared gas turbine engine with a gear ratio of 2.5 to 6.0, when the relationship (3) below applies for a number of fan blades, a fan blade aspect ratio, and a fan specific flow, the inventors have found there to be significant improvements to thrust and efficiency of the fan assembly:

$$15 < \frac{N_b * AR * 50}{SF} < 60 \qquad (3)$$

where $N_b$ is the number of fan blades, AR is the fan blade aspect ratio, and SF is the fan specific flow. The fan blade aspect ratio (AR) is determined by S/c, where S is the full span of the fan blade (i.e., as measured at a 100% span position at the blade leading edge) and c is the chord length at 50% span. The fan specific flow (SF) is determined by the ratio MF/FA, where MA is mass flow of the fan in lbs/sec and FA is the fan area in square feet. For convenience, the expression $N_b*AR$ is also referred to herein as NBAR.

The mass flow (MF) of the fan, as used herein, is the amount of air, measured in mass per unit time (pounds per second), that passes through the fan of a gas turbine engine during operation.

The fan area is defined by an annulus representing the portion of the fan 110 that is located outward of the fan disk 111. The fan area can be determined by the formula $\pi R^1_2 - \pi R_2^2$ where $R_1$ is half the fan diameter 220 (219 in FIG. 3) and $R_2$ is the radius of the fan disk 111 taken from the centerline (215 in FIG. 3).

Exemplary ranges for the elements of the gas turbine engines described herein are provided below in Table 3 for geared gas turbine engines with gear ratios in the range 2.7 to 6.0. As shown in Table 3, for some variables, the number of fan blades range from 10 to 26 and NBAR*50/SF varies from 15.0-59.77.

TABLE 3

| Engine Example | Nb | AR | NBAR | SF | NBAR*50/SF |
|---|---|---|---|---|---|
| 1 | 10 | 1.35 | 13.5 | 45.0 | 15.0 |
| 2 | 18 | 1.8 | 32.4 | 42.0 | 38.57 |
| 3 | 12 | 1.50 | 18.0 | 46.0 | 19.57 |
| 4 | 26 | 2 | 52 | 43.5 | 59.77 |
| 5 | 16 | 1.60 | 25.6 | 44.5 | 28.76 |
| 6 | 24 | 2 | 48 | 43.0 | 55.81 |
| 7 | 18 | 1.9 | 34.2 | 43.0 | 39.77 |
| 8 | 16 | 1.85 | 29.6 | 40.0 | 37.0 |
| 9 | 22 | 1.8 | 39.6 | 42.0 | 47.14 |

Thus, as shown above, the number of blades $N_b$ can vary from 10-26, or in some embodiments from 12-22 or 12-18.

The aspect ratio (AR) can vary from 1.3-2.2, or as shown in the examples above from 1.35-2.0 or 1.5-2.0. In some embodiments, the specific flow (SF) can vary from 38-48, 40-47 (lbs/sec)/sq ft.

For some of the above engines, with geared gas turbine engines having gear ratios in the range 2.5 to 6.0, and for fan blade count $N_b$ from 12-22, the following relationship (4) applies:

$$19.5 < \frac{N_b * AR * 50}{SF} < 47.2 \qquad (4)$$

For some of the above engines, with geared gas turbine engines having gear ratios in the range 2.5 to 6.0, and for fan blade count $N_b$ from 16-18, the following relationship (5) applies:

$$28 < \frac{N_b * AR * 50}{SF} < 40 \qquad (5)$$

The above relationships result from the inventors findings, particularly the trade-offs between blade count, aspect ratio, and specific flow, which were unexpected and provided a novel approach to balancing efficiency, reliability, and aerodynamic performance in gas turbine engines.

Further aspects are provided by the subject matter of the following clauses:

1: A gas turbine engine comprising a core turbine engine comprising a low pressure turbine; a gearbox assembly coupled to the low pressure turbine, the gearbox assembly having a gear ratio within a range of 2.5 to 6.0; a fan coupled to the gearbox assembly and having a fan diameter, a fan area, and a plurality of composite fan blades that have a chord length c1 at a 75% span position and a chord length c2 at a 50% span position; a blade effective acoustic length (BEAL) defined as:

$$BEAL = \frac{2c1^2}{s(1 - rr)N_b}\cos(\gamma)$$

wherein S is a span of the fan blade, rr is a radius ratio of the fan, $\gamma$ is a stagger angle of the fan blade, and $N_b$ is the number of the plurality of composite fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at the 75% span position; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; an inlet-to-nacelle (ITN) ratio defined as a ratio of the inlet length to a maximum diameter of the nacelle, wherein the ASR of the gas turbine engine is 1.5 to 16.0, and the ITN ratio is 0.23 to 0.35 and wherein the gas turbine engine is characterized by an improved fan assembly efficiency in which the following equation applies:

$$15 < \frac{N_b * AR * 50}{SF} < 60$$

wherein AR is a fan blade aspect ratio, and SF is a fan specific flow, and the fan blade aspect ratio (AR) is determined from S/c2, and the fan specific flow (SF) is determined from MF/FA, where MA is a mass flow of the fan and FA is a fan area.

2: The gas turbine engine as paragraph 1 describes, where the number of composite fan blades (Nb) ranges from 10 to 26.

3: The gas turbine engine as either of paragraphs 1 or 2 describe, where the fan blade aspect ratio (AR) ranges from 1.3 to 2.2.

4: The gas turbine engine as any of paragraphs 1-3 describe, where the fan specific flow (SF) ranges from 38 to 48 lbs/sec per square foot.

5: The gas turbine engine as any of paragraphs 1-4 describe, where the gearbox assembly has a gear ratio ranging from 3.2 to 4.0.

6: The gas turbine engine as any of paragraphs 1-5 describe, where the gearbox assembly has a gear ratio ranging from 3.25 to 3.75.

7: The gas turbine engine as any of paragraphs 1-6 describe, where the plurality of fan blades may include composite materials that include a matrix and a plurality of fiber plies, and the plurality of fiber plies are interwoven in in-plane and out-of-plane orientations.

8: The gas turbine engine as any of paragraphs 1-7 describe, where the gas turbine engine is characterized by an improved fan assembly efficiency in which the following equation applies: 19.5< (Nb*AR*50)/SF<47.2.

9: The gas turbine engine as any of paragraphs 1-8 describe, where the gas turbine engine is characterized by an improved fan assembly efficiency in which the following equation applies: 28< (Nb*AR*50)/SF<40.

10: The gas turbine engine as any of paragraphs 1-9 describe, further may include a fan pressure ratio from 1.3 to 1.55.

11: A gas turbine engine comprising a core turbine engine comprising a low pressure turbine; a gearbox assembly coupled to the low pressure turbine, the gearbox assembly having a gear ratio within a range of 2.5 to 5.0; a fan coupled to the gearbox assembly and having a fan diameter, a fan area, and a plurality of composite fan blades that have a chord length c1 at a 75% span position and a chord length c2 at a 50% span position; a blade effective acoustic length (BEAL) defined as:

$$BEAL = \frac{2c1^2}{s(1 - rr)N_b}\cos(\gamma)$$

wherein S is a span of the fan blade, rr is a radius ratio of the fan, $\gamma$ is a stagger angle of the fan blade, and $N_b$ is the number of the plurality of composite fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at the 75% span position; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; wherein the ASR of the gas turbine engine is 4.0 to 16.0, wherein the gas turbine engine is characterized by an improved fan assembly efficiency in which the following equation applies:

$$15 < \frac{N_b * AR * 50}{SF} < 60$$

wherein AR is a fan blade aspect ratio, and SF is a fan specific flow, and the fan blade aspect ratio (AR) is determined from S/c2, and the fan specific flow (SF) is determined from MF/FA, where MA is a mass flow of the fan and FA is a fan area.

12: The gas turbine engine as paragraph 11 describes, where the number of composite fan blades (Nb) ranges from 12 to 22.

13: The gas turbine engine as either of paragraphs 11 or 12 describe, where the fan blade aspect ratio (AR) ranges from 1.3 to 2.0.

14: The gas turbine engine as any of paragraphs 11-13 describe, where the number of composite fan blades (Nb) ranges from 12 to 18.

15: The gas turbine engine as any of paragraphs 11-14 describe, where the fan blade aspect ratio (AR) ranges from 1.5 to 2.0.

16: The gas turbine engine as any of paragraphs 11-15 describe, where the gearbox assembly has a gear ratio ranging from 3.2 to 4.0.

17: The gas turbine engine as any of paragraphs 11-16 describe, where the gearbox assembly has a gear ratio ranging from 3.25 to 3.75.

18: The gas turbine engine as any of paragraphs 11-17 describe, where the engine is further characterized by an improved fan assembly efficiency parameter defined by the relation 19.5< (Nb*AR*50)/SF<47.2 or 28< (Nb*AR*50)/SF<40.

19: The gas turbine engine as any of paragraphs 1-18 describe, wherein each composite fan blade comprises a polymer matrix composite (PMC) formed from a plurality of stacked prepreg layers, the prepreg layers being pre-impregnated with a thermoplastic resin selected from the group consisting of polyetheretherketone (PEEK), polyetherketoneketone (PEKK), polyetherimide (PEI), polyaryletherketone (PAEK), and polyphenylene sulfide (PPS).

20: The gas turbine engine as any of paragraphs 1-18 describe, wherein each composite fan blade comprises a polymer matrix composite (PMC) formed from a plurality of stacked prepreg layers, the prepreg layers being pre-impregnated with a thermoset resin selected from the group consisting of epoxy, bismaleimide (BMI), and polyimide resins.

21. The gas turbine engine as any of paragraphs 1-18 describe, wherein each composite fan blade comprises a woven fabric formed from dry carbon fibers interwoven with thermoplastic polymer fibers, the woven fabric being tailored to achieve a predetermined fiber volume and mechanical properties.

22. The gas turbine engine as any of paragraphs 1-18 describe, wherein each composite fan blade comprises a braided architecture formed from reinforcement fibers selected from the group consisting of carbon fibers, glass fibers, and thermoplastic fibers.

23. The gas turbine engine as any of paragraphs 1-18 describe, wherein each composite fan blade is formed using resin transfer molding (RTM), the RTM process comprising the application of dry fibers to a mold, impregnation of the fibers with resin, and curing to form a fiber-reinforced composite blade.

24. The gas turbine engine as any of paragraphs 1-18 describe, wherein each composite fan blade is formed using a vacuum-assisted resin transfer molding (RTM) process, wherein air is removed from the mold cavity and replaced with resin prior to curing.

25. The gas turbine engine as any of paragraphs 1-18 describe, wherein each composite fan blade comprises a plurality of layers of adhesive between the composite plies, the adhesive being selected from resin and phenolics and requiring curing at elevated temperatures.

26. The gas turbine engine as any of paragraphs 1-18 describe, wherein each composite fan blade comprises reinforcement fibers interwoven in multiple orientations, including in-plane and out-of-plane orientations.

27. The gas turbine engine as any of paragraphs 1-18 describe, wherein each composite fan blade comprises a combination of carbon fibers for strength, glass fibers for impact resistance, and thermoplastic fibers for binding.

28. The gas turbine engine as any of paragraphs 1-27 describe, further comprising a fan pressure ratio from 1.25 to 1.45.

29. The gas turbine engine as any of paragraphs 1-28 describe, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

30. The gas turbine engine as any of paragraphs 1-29 describe, wherein the fan case further comprises an acoustic treatment disposed on an interior surface of the fan case, and, optionally, the acoustic treatment length is 50% to 90% of an inlet length.

31. The gas turbine engine as any of paragraphs 1-30 describe, wherein the number of the plurality of outlet guide vanes is at least twice the number of the plurality of fan blades.

32. The gas turbine engine as any of paragraphs 1-31 describe, wherein the low pressure turbine comprises at least three low pressure turbine stages or at least four low pressure turbine stages.

33. The gas turbine engine as any of paragraphs 1-32 describe, wherein plurality of outlet guide vanes further comprise serrated leading edges.

34. The gas turbine engine as any of paragraphs 1-33 describe, wherein a fan blade diameter of the fan blade is 65-80 inches, 80-95 inches, or 95-115 inches.

35. The gas turbine engine as any of paragraphs 1-34 describe, wherein the number of the plurality of fan blades is 14-26, 20-24, or 20-22.
36. The gas turbine engine as any of paragraphs 1-35 describe, wherein the blade solidity is 0.8 to 1.5, 1.0 to 2.0, or 1.25 to 1.75.
37. The gas turbine engine as any of paragraphs 1-36 describe, wherein the gas turbine engine has a bypass ratio of 10:1 to 17:1 or 12:1 to 15:1.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:
a core turbine engine comprising a low pressure turbine;
a gearbox assembly coupled to the low pressure turbine, the gearbox assembly having a gear ratio within a range of 2.5 to 6.0;
a fan coupled to the gearbox assembly and having a fan diameter, a fan area, and a plurality of composite fan blades that have a chord length c1 at a 75% span position and a chord length c2 at a 50% span position;
a blade effective acoustic length (BEAL) defined as:

$$BEAL = \frac{2c1^2}{S(1-rr)N_b}\cos(\gamma)$$

wherein S is a span of the fan blade, rr is a radius ratio of the fan, $\gamma$ is a stagger angle of the fan blade, and $N_b$ is the number of the plurality of composite fan blades;
a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at the 75% span position;
a plurality of outlet guide vanes disposed aft of the fan and extending radially between the core turbine engine and the fan case;
an acoustic spacing from the fan blade trailing edge to an outlet guide vane leading edge;
an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes;
an inlet-to-nacelle (ITN) ratio defined as a ratio of the inlet length to a maximum diameter of the nacelle,
wherein the ASR of the gas turbine engine is 1.5 to 16.0, and the ITN ratio is 0.23 to 0.35 and
wherein the gas turbine engine is characterized by an improved fan assembly efficiency in which the following relationship applies:

$$15 < \frac{N_b * AR * 50}{SF} < 60$$

wherein AR is a fan blade aspect ratio, and SF is a fan specific flow, and the fan blade aspect ratio (AR) is determined from S/c2, and the fan specific flow (SF) is determined from MF/FA, where MA is a mass flow of the fan and FA is a fan area.

2. The gas turbine engine of claim 1, wherein the plurality of composite fan blades have with a blade solidity that is greater than or equal to 0.8 and less than or equal to 2.0.
3. The gas turbine engine of claim 1, wherein the number of composite fan blades (Nb) ranges from 10 to 26.
4. The gas turbine engine of claim 1, wherein the number of composite fan blades (Nb) ranges from 12 to 22.
5. The gas turbine engine of claim 1, wherein the fan blade aspect ratio (AR) ranges from 1.3 to 2.2.
6. The gas turbine engine of claim 1, wherein the number of composite fan blades (Nb) ranges from 12 to 18.
7. The gas turbine engine of claim 6, wherein the fan blade aspect ratio (AR) ranges from 1.5 to 1.9.
8. The gas turbine engine of claim 1, wherein the gearbox assembly has a gear ratio ranging from 2.7 to 4.0.
9. The gas turbine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline,
wherein the DBD ratio of the gas turbine engine is 0.09 to 0.59.
10. The gas turbine engine of claim 9, wherein the DBD ratio of the gas turbine engine is 0.15 to 0.35.
11. The gas turbine engine of claim 9, wherein the DBD ratio of the gas turbine engine is 0.19 to 0.27.
12. The gas turbine engine of claim 1, wherein the gas turbine engine is characterized by an improved fan assembly efficiency in which the following relationship applies:

$$19.5 < \frac{N_b * AR * 50}{SF} < 47.2.$$

13. The gas turbine engine of claim 1, wherein the gas turbine engine is characterized by an improved fan assembly efficiency in which the following relationship applies:

$$28 < \frac{N_b * AR * 50}{SF} < 40.$$

14. A gas turbine engine comprising:
a core turbine engine comprising a low pressure turbine;
a gearbox assembly coupled to the low pressure turbine, the gearbox assembly having a gear ratio within a range of 2.5 to 5.0;
a fan coupled to the gearbox assembly and having a fan diameter, a fan area, and a plurality of composite fan blades that have a chord length c1 at a 75% span position and a chord length c2 at a 50% span position;
a blade effective acoustic length (BEAL) defined as:

$$BEAL = \frac{2c1^2}{s(1-rr)N_b}\cos(\gamma)$$

wherein S is a span of the fan blade, rr is a radius ratio of the fan, $\gamma$ is a stagger angle of the fan blade, and $N_b$ is the number of the plurality of composite fan blades;

a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at the 75% span position;

a plurality of outlet guide vanes disposed aft of the fan and extending radially between the core turbine engine and the fan case;

an acoustic spacing from the fan blade trailing edge to an outlet guide vane leading edge;

an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes;

wherein the ASR of the gas turbine engine is 4.0 to 16.0, wherein the gas turbine engine is characterized by an improved fan assembly efficiency in which the following relationship applies:

$$15 < \frac{N_b * AR * 50}{SF} < 60$$

wherein AR is a fan blade aspect ratio, and SF is a fan specific flow, and the fan blade aspect ratio (AR) is determined from S/c2, and the fan specific flow (SF) is determined from MF/FA, where MA is a mass flow of the fan and FA is a fan area.

15. The gas turbine engine of claim 14, wherein the number of composite fan blades (Nb) ranges from 12 to 22.

16. The gas turbine engine of claim 14, wherein the number of composite fan blades (Nb) ranges from 12 to 18.

17. The gas turbine engine of claim 14, wherein the fan blade aspect ratio (AR) ranges from 1.3 to 2.0.

18. The gas turbine engine of claim 14, wherein the fan blade aspect ratio (AR) ranges from 1.5 to 2.0.

19. The gas turbine engine of claim 14, wherein the gearbox assembly has a gear ratio ranging from 3.2 to 4.0.

20. The gas turbine engine of claim 14, wherein the engine is further characterized by an improved fan assembly efficiency parameter defined by the relationship:

19.5<(Nb×AR×50)/SF<47.2.

* * * * *